INVENTOR.
JOSEPH F. KERN

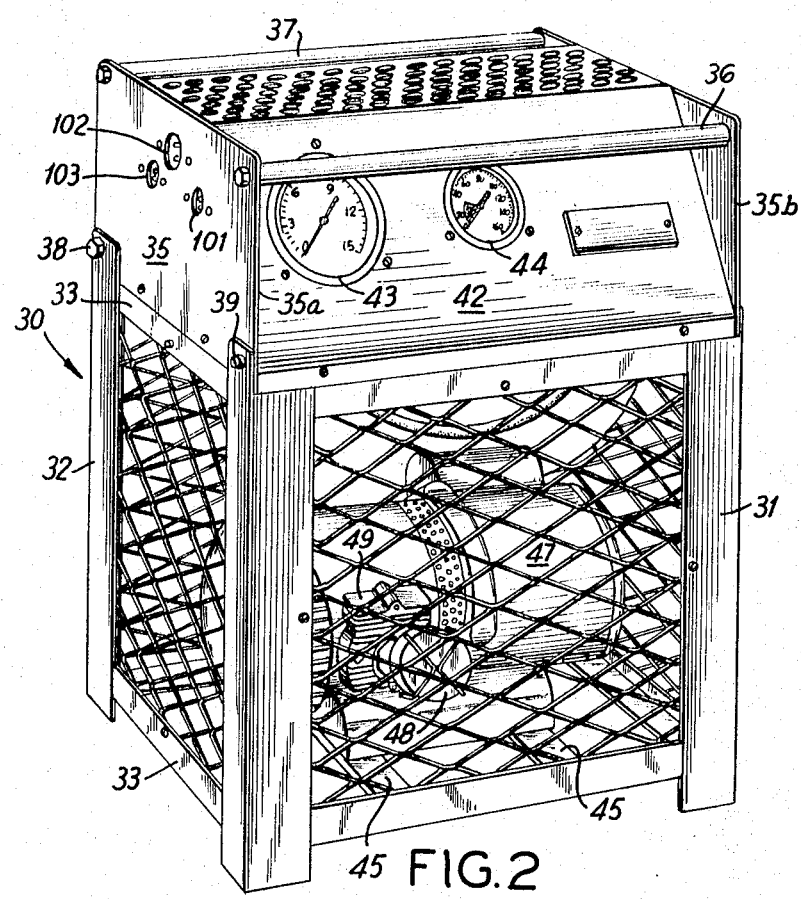

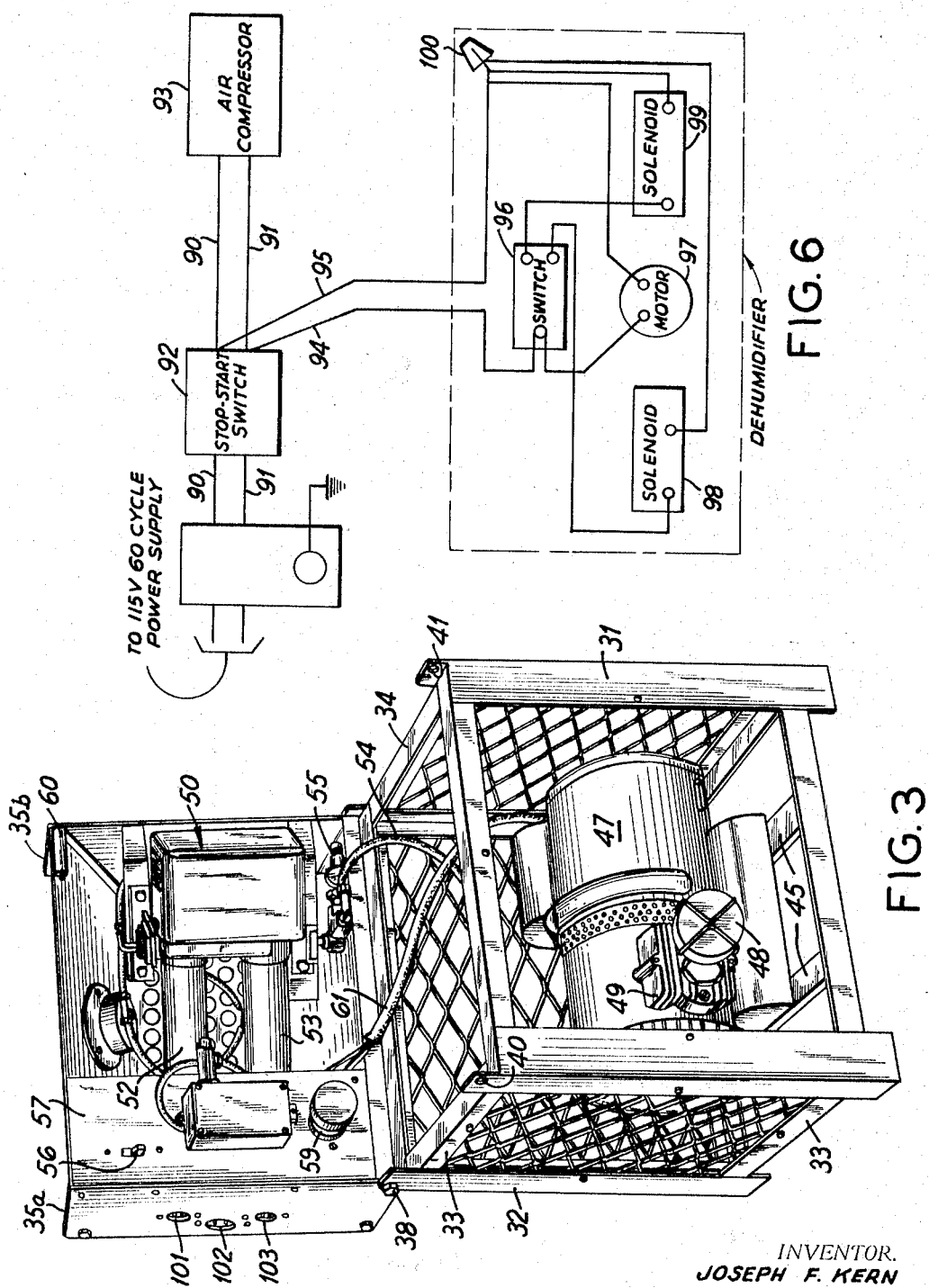

United States Patent Office 3,323,291
Patented June 6, 1967

3,323,291
EMERGENCY AIR DRYER FOR CABLE
PRESSURIZING SYSTEM
Joseph F. Kern, Massapequa, N.Y., assignor to Puregas
Equipment Corp., Copiague, N.Y., a corporation of
New York
Filed July 27, 1965, Ser. No. 475,107
1 Claim. (Cl. 55—162)

This invention relates to an air dryer system and, in particular, to a portable emergency air dryer apparatus adapted for use with a cable pressurizing system.

In a cable pressurizing system, such as is employed for communication cables, it is important that dry air be fed into the cable at substantially constant pressure and at a controlled low humidity so as to minimize any variation in electrical characteristics of the cable. It would be desirable where such air flow systems break down to provide an emergency air dryer, such as a portable unit, capable of operating automatically and at a high capacity.

It is thus the object of my invention to provide a portable emergency air dryer system.

Another object is to provide an automatically operable dry air generating system.

A further object is to provide apparatus for producing dry air continuously for use in pressurized cables or for other purposes.

These and other objects will more clearly appear when taken in conjunction with the following disclosure and the accompanying drawing, wherein:

FIG. 1 shows schematically an air drying system provided by my invention;

FIGS. 2 and 3 exemplify a portable air dryer in accordance with the invention;

FIGS. 4 and 5 are fragments of a dehumidifier; and

FIGS. 6 and 7 are illustrative of an electric circuit which may be employed in the automatic air dryer provided by the invention.

Figure 1:
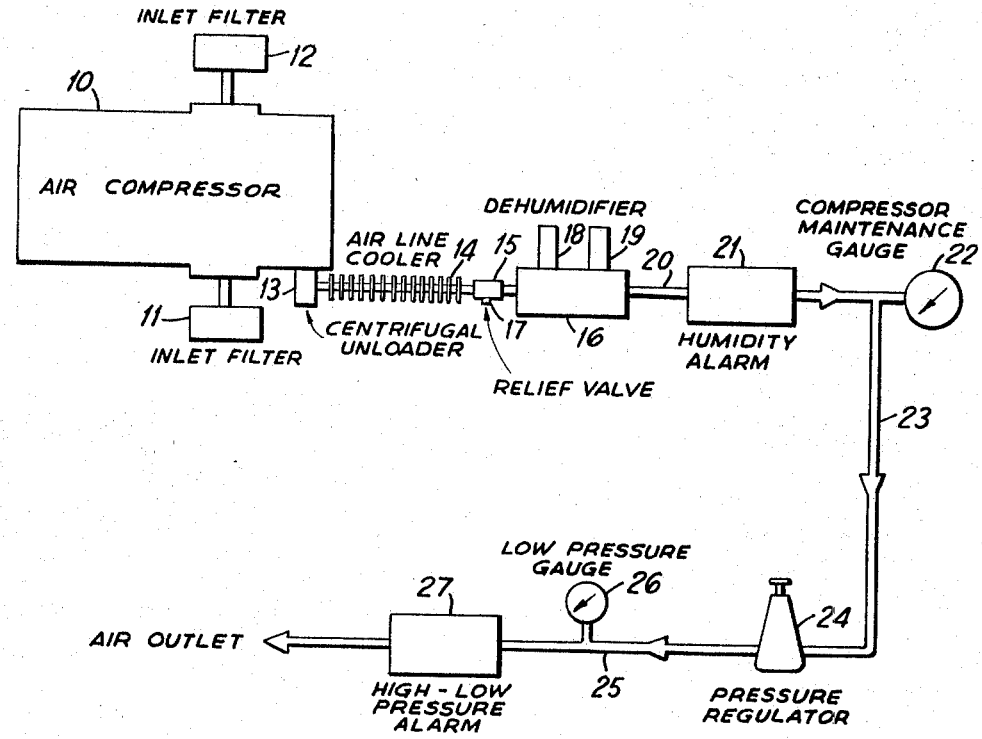

An important advantage of the apparatus resides in the fact that it can be adapted for portability and built to facilitate maintenance. The unit can be ruggedly built to occupy little space and still be capable of fairly high capacity, for example, of delivering 2400 standard cubic feet of dry air per day.

In its method aspects, the invention comprises continuously providing dry air for a pressurized cable system at a pressure of up to 15 p.s.i.g. by utilizing the steps of compressing air to a pressure of at least 60 p.s.i.g. and ranging up to a desired maximum pressure, such as 70 p.s.i.g., passing the air through a heat exchanger while bleeding of excess air when the air pressure exceeds the desired maximum pressure, continuously dehumidifying the air, and then decreasing the pressure of the dehumidified air to not exceeding about 15 p.s.i.g., with the humidity not exceeding 3% at 70° F. A characteristic of the portable unit is that it is extremely light, aluminum being advantageously employed in its construction. The unit has associated with it high and low pressure alarms and a humidity alarm, whereby the unit is capable of continuous control.

It is important that the air flow through the unit at a minimum high pressure in order to assure the desired dryness in the air leaving the dehumidifier. If the air pressure drops to below the minimum before it enters the dehumidifier, its dryness after the dehumidifying step is materially reduced. As illustrative of the invention, reference is made to FIG. 1 which is a schematic of one embodiment of the system comprising an air compressor 10 having a pair of air-inlet filters 11, 12 and an outlet 13 for the effluent air under pressure. Coupled to the outlet is a finned air line cooler 14 which is connected via a fitting or nipple 15 to dehumidifier 16. Coupled to fitting 15 is a relief valve 17 which is adapted to release air continuously when the pressure exceeds a predetermined maximum. The dehumidifier has a pair of chambers 18, 19, containing a desiccant, the pair being sequentially operable through respective solenoids and valves via a timer such that as the first chamber is being used to dry air during a thirty second cycle, the second is being regenerated or reactivated by using a portion of the dry air to purge it of collected moisture. Likewise, in a subsequent cycle, while the second chamber is being used to dry air, the first is being similarly regenerated. Thus, the dehumidifier is capable of continuous operation without the usual shutdown time which generally prevails in systems in which the desiccant has to be changed or reactivated.

Coupled to the line 20 into which the dried air is discharged is a humidity alarm 21 and a compressor maintenance gauge 22. The air then enters line 23 where it is modulated to a predetermined low pressure by regulatory valve 24, the low pressure air passing into line 25 to which is connected a low pressure gage 26. In addition, coupled to line 25 is a high-low pressure alarm 27. The low air pressure is then delivered to the site of use, such as to a pressurized cable.

As stated hereinbefore, the system in the form of a portable unit is capable of delivering continuously 2400 standard cubic feet per day of dry air at adjustable pressure of 0 to 15 p.s.i.g. at humidities of under 2% at 70° F. The operation of the air dryer is fully automatic and relatively maintenance-free. Essentially, the unit consists of an electric motor-driven oil-less air compressor, an automatic self-reactivating or self-regenerating dehumidifier and the necessary controls and alarms to ensure the delivery of air at the proper pressure and humidity. As will be appreciated, the air compressor may be driven by means other than an electric motor.

Referring to FIGS. 2 and 3, a portable unit provided by the invention is shown comprising a housing designated generally by the numeral 30 having a hinged ventilated hood or cover 35 and a lower base section having front and rear protective screened panels 31, 32 and side screened panels 33, 34. The hood 35 has a pair of handles 36, 37 mounted between hood side plates 35a and 35b by which the unit may be carried. To provide weather protection when the unit is used outside, hood 35 and panels 31, 32, 33 and 34 may be louvered instead of screened.

The cover or hood is hinged at 38 at the upper end of rear panel 32, the hood being lockable when closed by means of two spring pressure pins 39 at 40 and 41 at the top front cover where the side panels meet the front panel (FIG. 3). The hood has an inclined face 42 which serves as an instrument panel behind and on the face of which are housed air outlet pressure gauge 43 and compressor maintenance gauge 44.

Referring to FIG. 3, the lower base section of the unit has a bottom shelf 45 which supports the motor-compressor 47. A filter 48 is provided on each side of the compressor. In addition, an air line cooler 49 is shown for cooling the compressed air before it is passed to the dryer.

The dehumidifier 50 is mounted within the hood which comprises a base portion 51 and two desiccant chambers 52, 53. Air from the compressor passes through high pressure tubing 54 to relief valve 55 to the inlet side of the dehumidifier. The bottom of the hood also supports a start-stop switch 56 on instrument deck 57, high-low pressure switch 58, pressure regulator 59 and locking means 60 comprising a locking pin, spring screw, lockpin screw and lockpin spring. An electrical line 61 is provided extending from the instrument deck to motor-compressor 47.

Figure 3A:
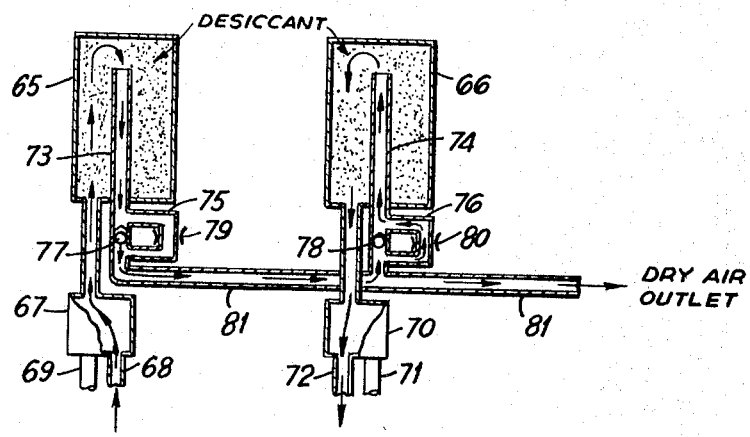
FIG. 3A is a schematic representation of a dehumidifier.

The detail operation of the dehumidifier is depicted in FIG. 3A. Two desiccant chambers 65, 66 are shown coupled in parallel. Associated with chamber 65 is a three-way solenoid valve 67 having inlet-outlet ports 68–69. Similarly associated with chamber 66 is a three-way solenoid valve 70 having inlet-outlet ports 71, 72. Air tubes 73, 74 are provided for the chambers, each of the tubes having, respectively, a flow offset 75, 76, with check valve 77, 78, each of the flow offsets having a pre-set orifice 79 and 80. The dehumidifier is self-reactivating as will be presently explained.

Referring first to chamber 65, air under pressure enters the solenoid valve inlet at 68 which is opened by an electric timer. The air flows directly as shown into chamber 65 where it gives up its moisture to the desiccant and then flows through air tube 73 past both the check valve 77 and orifice 79 into dry air outlet 81. This is one-half of the operating cycle. During this period, the desiccant in chamber 66 is being dried. Thus, while air inlet 71 is closed, a small amount of dry air from line 81 is bled off via preset orifice 80 (the check valve is closed) and allowed to flow through air tube 74 into chamber 66 where it absorbs moisture from the desiccant and carries it out through outlet 72 of solenoid valve 70. The orifice which is small is always open. It is calibrated to pass a small calculated air volume into the chamber, while the bulk of the dried air is delivered via outlet tube 81 to its destination. At the end of thirty seconds, the timer actuates the solenoids and reverses the air flow so that chamber 65 is purged of moisture while chamber 66 is drying air.

The alternating process continues as long as the dehumidifier is kept in operation, during which time a constant stream of super-dry air is delivered to the outlet.

As illustrative of a type of desiccating chamber that may be employed, reference is made to FIGS. 4 and 5. FIG. 4 is an exploded view showing the chamber 82 having a threaded end portion 83, a gasket 84 for reception in internally threaded flange 85 of base 86 shown fragmentarily. Also shown is a water deflector 87 in the form of a split annular spring clip having a pair of downwardly projecting ears at the split ends for insertion into a slot in the bottom of the flange. The purpose of the water deflector is to prevent water condensed in the air line cooler from being carried by the flow of air into the desiccant chamber.

Referring to FIG. 5, the water deflector is shown via its projecting ears in the base of flange 85 in slot 88. As air passing through port 89 enters the space within the flange, droplets of water carried over by the high pressure air strike the deflector and are collected at the base of the flange. In the meantime, air passes through perforated plate 87a into the chamber. During the purging cycle, the collected moisture is driven out by dry air through port 89 when the flow of air is reversed.

As stated hereinbefore, the operation of the air dryer is fully automatic and relatively maintenance-free. The portable unit may be designed to operate on power requirements of 115 volt, single phase, 60 cycle and up to 12 amperes. Operating temperatures may range from a minimum of 32° F. to a maximum of 110° F. An electrical circuit that may be employed in operating the unit is depicted in FIG. 6 which shows a pair of power lines 90, 91 coupled to a 115 volt 60 cycle power supply. Connected across the lines is a stop-start switch 92 which in turn is coupled to air compressor 93 and to the dehumidifier via lines 94–95, which lines are coupled to reversing switch 96, timing motor 97 and solenoids 98, 99 via common post 100. The timing motor is of the conventional type and is set to operate the solenoids in thirty second cycles as previously described. In addition, as shown in FIG. 7, a high-low pressure alarm and a humidity alarm are coupled to an alarm pair. Referring to FIGS. 2 and 3, it will be noted that plug and jack means are provided for receiving the alarm connectors at 101 and the power line at 102. In addition, an air outlet means is provided at 103 for receiving a detachable air hose.

As has been stated, the top cover is secured with two spring loaded locking pins located at the said front corners of the hood which cooperate with means 40 and 41 of the base section (FIG. 3). To unlock the hood, the locking pins are pushed inwardly approximately one-half inch with a screw driver then turned in either direction a quarter turn to retain the pins in the recessed position. After both lockpins have been recessed, the hood is swung open about pivot hinge 38 (FIG. 3).

The master switch 56 is then turned to the "on" position. The handle of pressure regulator 59 is turned counter-clockwise until there is no air bleeding from the dry air outlet at 103. At this point the air compressor maintenance gauge 44 (FIG. 2) should show a pressure of about 65 to 70 p.s.i.g. While the dehumidifier is going through its alternate thirty second cycle, a normal momentary drop in pressure will be noted on the pressure gauge. The pressure gauge is then opened to permit a low flow of air to bleed through dry air outlet 103. At no time is the pressure permitted to drop below 60 p.s.i.g., except during the normal thirty second bleed-off interval of the dehumidifier.

The humidity alarm 21 (FIG. 1) has in the meantime been pre-set to the desired humidity control. The air dryer or dehumidifier is operated with the dry air bleeding from outlet 103 (FIGS. 2 and 3) until the humidity alarm clears. To determine when the humidity alarm clears, it is necessary to build up the outlet pressure to 9 p.s.i.g. in order to clear the high-low pressure alarm 27 shown in FIG. 1. This is determined by holding a finger over the dry air outlet to stop the air flow and then turning pressure regulator 24 (FIG. 1). If the alarm circuit is open when the outlet pressure is approximately 9 p.s.i.g., it is an indication that the humidity alarm is clear. If the alarm is not clear, the step is repeated to allow the air dryer to operate for several more minutes. As soon as the humidity alarm clears, that is, the air has been dried to a very low moisture content, the air dryer is ready for service. The pressure regulator controlling flow to the outlet is then shut off and the air hose connected to the cable system.

Usually the cable system will initially require an excess flow of air to bring the pressure back to a normal condition. In this event, the pressure is usually built up gradually by slowly opening the pressure regulator while observing the air compressor gauge which should not fall below 60 p.s.i.g., except during the thirty second bleed-off. When the normal cable pressure has been reached, the pressure regulator is fixed in its position by tightening a locknut.

After completing the foregoing, the top hood or cover is closed and the locking pins released to locking position. The relief valve which is coupled to the air line before the inlet of the air dryer is set to open at approximately 70 p.s.i.g. to prevent overheating of the air compressor motor due to excessive pressure.

The activation of the humidity alarm will depend upon the moisture content of the air issuing from the air dryer. Wet air can be caused by low delivered air pressure to the air dryer. It is thus important that the air pressure to the air dryer be at least 60 p.s.i.g., otherwise if the air pressure drops too low below this minimum, the dryness of the air leaving the air dryer is materially reduced. Preferably, the temperature of the air going into the air dryer should be maintained below 110° F. and preferably not exceed 100° F. as the efficiency of the air dryer falls off above 100° F. The operating temperature may range from 32° F. to below 110° F.

Summarizing the foregoing, as ambient air is drawn through the intake filters of the compressor delivered through the air line cooler to the air dryer at say 70 p.s.i.g., the compressor operates continuously while the relief valve prevents the pressure from exceeding 70 p.s.i.g. The dry air leaving the air dryer passes through the humidity alarm which is pre-set to close the alarm circuit in the event the relative humidity of the air exceeds about 3% at 70° F. The dry air is then expanded through the pressure regulator to the required cable pressure. Just before the dry air outlet, a high-low pressure alarm and an outlet pressure gauge are pneumatically coupled to the air line.

Activation of either alarm brings in a central office alarm. Thus, in the event of high humidity, the humidity alarm will operate and the alarm circuit of the air dryer will close. Likewise, in the event of a low or high pressure condition in the dry air line, the alarm circuit of the air dryer will close by operation of the high-low pressure alarm. The high-low pressure alarm might, for example, be pre-set at approximately 10.5±1.5 p.s.i.g. for the low pressure end.

The term "air" employed herein is used in the broad sense to apply to any type of gas that lends itself to the foregoing treatment. Examples of other gases are nitrogen, argon, gaseous mixtures and the like.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claim.

What is claimed is:

A continuously operable portable emergency dryer comprising, a housing having a lower section with rear, front and side panels, a hood pivotally hinged to the top of the rear panel and having means for connecting it to the top of the front panel in the closed position, said lower section having a supporting shelf near the bottom thereof, a motor-compressor supported on the shelf of said lower section, said compressor having at least one air inlet filter associated therewith and an air outlet line, a heat exchanger associated with the air outlet of said compressor, an air relief valve coupled to the air outlet downstream of said heat-exchanger, a pair of reciprocally operable dehumidifiers supported within the hood and connected in said high pressure line downstream of said relief valve, each of said dehumidifiers comprising a self-purgeable chamber containing a regeneratable desiccant, each of said chambers including a chamber inlet and a chamber outlet, each of said chamber outlets comprising a pre-set orifice passage connected directly in parallel with a check valve, a solenoid actuated valve associated with each chamber for allowing normal flow of dry air out of its associated chamber and also for allowing a restricted flow of air into said chamber during a reverse cycle, each of said solenoids having an inlet port and an outlet port and a connecting port, one of said solenoid valves having its inlet and connecting ports connected respectively to said high pressure line and the inlet of one chamber, the other of said solenoid valves having its inlet and connecting ports connected respectively to said high pressure line and the inlet of the other chamber, means coupling each of said chamber outlets in parallel directly to said high pressure line, each of said chamber inlets further including water deflector means for collecting water in the base of said chamber, each of said deflector means including a metallic member provided in the path of air entering the associated chamber to thereby remove droplets of water in the air striking said member, a circuit including a timer and switch means for cyclically actuating said solenoids in accordance with a predetermined desiccating-regenerating cycle whereby one of said dehumidifiers removes moisture from said high pressure line and simultaneously provides dry air to the other dehumidifier to regenerate the same, a humidity sensing device coupled to the air line downstream of the outlet of said dehumidifiers, a pressure gauge for measuring the pressure in the air outlet line of said compressor, a pressure regulator for modulating the high pressure air to a desired low pressure for delivering to a low pressure line, and a high-low pressure sensing device in said low pressure line.

References Cited

UNITED STATES PATENTS

| | | | |
|---|---|---|---|
| 2,955,673 | 10/1960 | Kennedy et al. | 55—163 |
| 3,144,314 | 8/1964 | Jackson | 55—76 X |
| 3,192,686 | 7/1965 | Berkey et al. | 55—21 |

REUBEN FRIEDMAN, *Primary Examiner.*

C. N. HART, *Assistant Examiner.*